(12) United States Patent
Zohrabyan et al.

(10) Patent No.: US 7,114,860 B2
(45) Date of Patent: Oct. 3, 2006

(54) METHOD AND DEVICE FOR COUPLING A LIGHT EMITTING SOURCE TO AN OPTICAL WAVEGUIDE

(75) Inventors: Armen Zohrabyan, Quebec City (CA); Tigran Galstian, Quebec City (CA); Dany Dumont, Quebec City (CA); Amir Tork, Cap Rouge (CA)

(73) Assignee: Photintech, Inc., Ste-Foy (CA)

( * ) Notice: Subject to any disclaimer, the term of this patent is extended or adjusted under 35 U.S.C. 154(b) by 196 days.

(21) Appl. No.: 10/736,756

(22) Filed: Dec. 17, 2003

(65) Prior Publication Data

US 2004/0165839 A1    Aug. 26, 2004

Related U.S. Application Data

(60) Provisional application No. 60/433,768, filed on Dec. 17, 2002.

(51) Int. Cl.
*G02B 6/36* (2006.01)
(52) U.S. Cl. .............. 385/91; 385/52; 385/147
(58) Field of Classification Search ................ 385/52, 385/88–94, 147
See application file for complete search history.

(56) References Cited

U.S. PATENT DOCUMENTS

| 4,691,987 | A | * | 9/1987 | Ebner et al. ................. 385/134 |
| 4,720,163 | A | * | 1/1988 | Goodwin et al. .............. 385/90 |
| 4,884,015 | A | * | 11/1989 | Sugimoto et al. ........... 318/640 |
| 5,745,624 | A | * | 4/1998 | Chan et al. .................... 385/91 |
| 5,871,559 | A | * | 2/1999 | Bloom ......................... 65/501 |
| 5,970,749 | A | * | 10/1999 | Bloom ......................... 65/378 |
| 6,616,346 | B1 | * | 9/2003 | Brown et al. .................. 385/90 |
| 6,690,864 | B1 | * | 2/2004 | Dee et al. ...................... 385/52 |
| 2002/0131729 | A1 | * | 9/2002 | Higgins, III ................. 385/91 |

* cited by examiner

*Primary Examiner*—Kevin S. Wood
(74) *Attorney, Agent, or Firm*—Kent Daniels; Ogilvy Renault LLP

(57) ABSTRACT

In a method for coupling an optical waveguide to a light emitting diode (LED) within a resin case, an input end of the optical waveguide is mounted proximal to a surface formed in the resin case parallel to a light-emitting face of the LED. The optical waveguide and the resin case can be bonded by a light or thermally curable resin that is applied and subsequently solidified. The light or thermally curable resin may be a photopolymer sensitive to light emerging from the waveguide. An automated coupling system is provided to optimize the coupling conditions using the in-coupled light efficiency feedback and controller. Finally a method is described allowing the coupling efficiency to be controlled using external excitation forces or light intensity variations, using electro-optic, magneto-optic, thermo-optic, light polarization sensitive or nonlinear properties of the filler material used between the resin case and waveguide.

1 Claim, 4 Drawing Sheets

METHOD AND DEVICE FOR COUPLING A LIGHT EMITTING SOURCE TO AN OPTICAL WAVEGUIDE

CROSS-REFERENCE TO RELATED APPLICATIONS

This application is based on, and claims benefit under 35 U.S.C. §119(e) of, U.S. Patent Application No. 60/433,768 filed Dec. 17, 2002.

MICROFICHE APPENDIX

Not Applicable.

TECHNICAL FIELD

The invention relates to a method of coupling light from a light emitting device to a waveguide structure, and in particular, to a method and aparatus for coupling the radiation of a conventional-light emitting diode (LED) to an optical fiber.

BACKGROUND OF THE INVENTION

Semiconductor light emitting devices, such as laser diodes (LD) and LEDs are widely used as high efficiency direct electric modulation light sources for testing of various passive and active optical components, as well as for illumination. A LED usually is a large spectral bandwidth Lambertian source with a broad emitting area, which makes it difficult to efficiently couple the light radiation to relatively small cross section waveguide structures, such as fibers.

Traditional methods of coupling a light into the fiber use micro-lens components positioned between the light source and the fiber. Typical examples of this type of system are shown in U.S. Pat. No. 5,215,489 entitled METHOD OF MAKING AN OPTICAL SEMICONDUCTOR MODULE, which issued on Jun. 1, 1993 to Nakamura, Canadian patent No 2,159,136 entitled OPTICAL FIBER ASSEMBLY, which issued on Jul. 3, 2001 to Takahashi and Canadian Patent No 1,113,762 entitled OPTICAL COUPLER FOR CONNECTING A LIGHT SOURCE TO AN OPTICAL TRANSMISSION LINE, which issued on Dec. 8, 1981 to Balliet. Thus, light emerging from the light source passes through a micro-lens system and traverses several optical surfaces (between media with different refractive indices), which introduces undesirable reflection losses. In addition, the required micro-optical components, and the need for fine micro positioning of these elements, significantly decrease the performance of the device and increase its cost, particularly for small diameter components such as single mode fibers, etc.

Different approaches are known for addressing the problem of increasing the coupling efficiency between the LED and optical fiber. For example, U.S. Pat. No. 4,376,946 entitled SUPERLUMINESCENT LED WITH EFFICIENT COUPLING TO OPTICAL WAVEGUIDE, which issued on Mar. 15, 1983 to Kaminow et al., teaches a method of coupling a super luminescent LED having lateral confinement of the light in the junction plane, to an optical waveguide. According to Kaminow et al., a special waveguide defined in the LED by different refractive index semiconductor layers is constructed to have an effective numerical aperture equal to the numerical aperture of the optical waveguide. As a result, photons emitted by the LED can be effectively guided into the optical waveguide. The device of Kaminow et al. suffers the limitation that it requires a special (costly) superluminescent LED having a spectral bandwidth, which is narrower than an ordinary LED's bandwidth. However, often a conventional broad bandwidth LED's light is preferable for utilization in optical testing equipment.

U.S. Pat. No. 4,826,272 entitled MEANS FOR COUPLING AN OPTICAL FIBER TO AN OPTO-ELECTRONIC DEVICE, which issued on May 2, 1989 to Pimpinella et al., teaches a system for coupling an optical fiber and semiconductor device by inserting the fiber and light source into "wells" formed in a supporting body. Precise and expensive technological processes such as photolithography and selective etching must be used for the manufacturing of this structure.

U.S. Pat. No. 4,170,399 entitled LED FIBER OPTIC CONNECTOR, which issued on Oct. 9, 1979 to Hansen et al., teaches an improved connector scheme for coupling the output of a LED to an optical fiber. In this case, a large-diameter optical fiber having a wide angle of acceptance is placed in abutting position against one side surface of the LED. The diameter of the fiber exceeds the thickness of the LED and the fiber has a wide angle of acceptance (about 64 degrees) that encompasses substantially all the light emitted through the surface of the LED. Accordingly, this approach is not suitable for use with standard optical fibers, which are typically much narrower in diameter and have a much narrower angle of acceptance (25–30 degrees).

Accordingly a method of optically connecting a standard light emitting device to an optical waveguide structure that is both efficient and inexpensive, remains highly desirable.

SUMMARY OF THE INVENTION

Therefore an object of the present invention is to provide a method and system for optically coupling a standard low-cost light emitting device (e.g. a LED) to an optical waveguide.

According to a first aspect of the invention, there is provided a method of coupling an optical waveguide to a LED package having a semiconductor LED chip encased in a resin case. The method comprises steps of removing a special section of the resin case to expose a surface closely proximal to a light-emitting face of the semiconductor LED chip and substantially perpendicular to light-generating layers of the semiconductor LED chip; and mounting an input end of the optical waveguide proximal the surface and substantially perpendicular to the surface. An input end face of the optical waveguide is mounted closely proximal the light-emitting face of the semiconductor LED chip. The space between the light emitting source and the input face of the wave guide is preferably filled by an ordinary or a photo curable or photopolymerizable index matching liquid to reduce coupling losses.

According to a second aspect of the invention, there is provided a coupling system of an optical waveguide to a LED package, based on described on the first aspect of present invention technique. A special coupling system in addition consists of feedback control to automate and optimize the coupling process. The input end face of the optical waveguide is thus mounted closely proximal the light-emitting face of the semiconductor LED chip and fixed after output power optimization.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides first methods and apparatus for efficiently coupling the radiation of light emitting devices such as a low-cost light emitting diode (LED) package to an optical fiber.

Figure 1A:
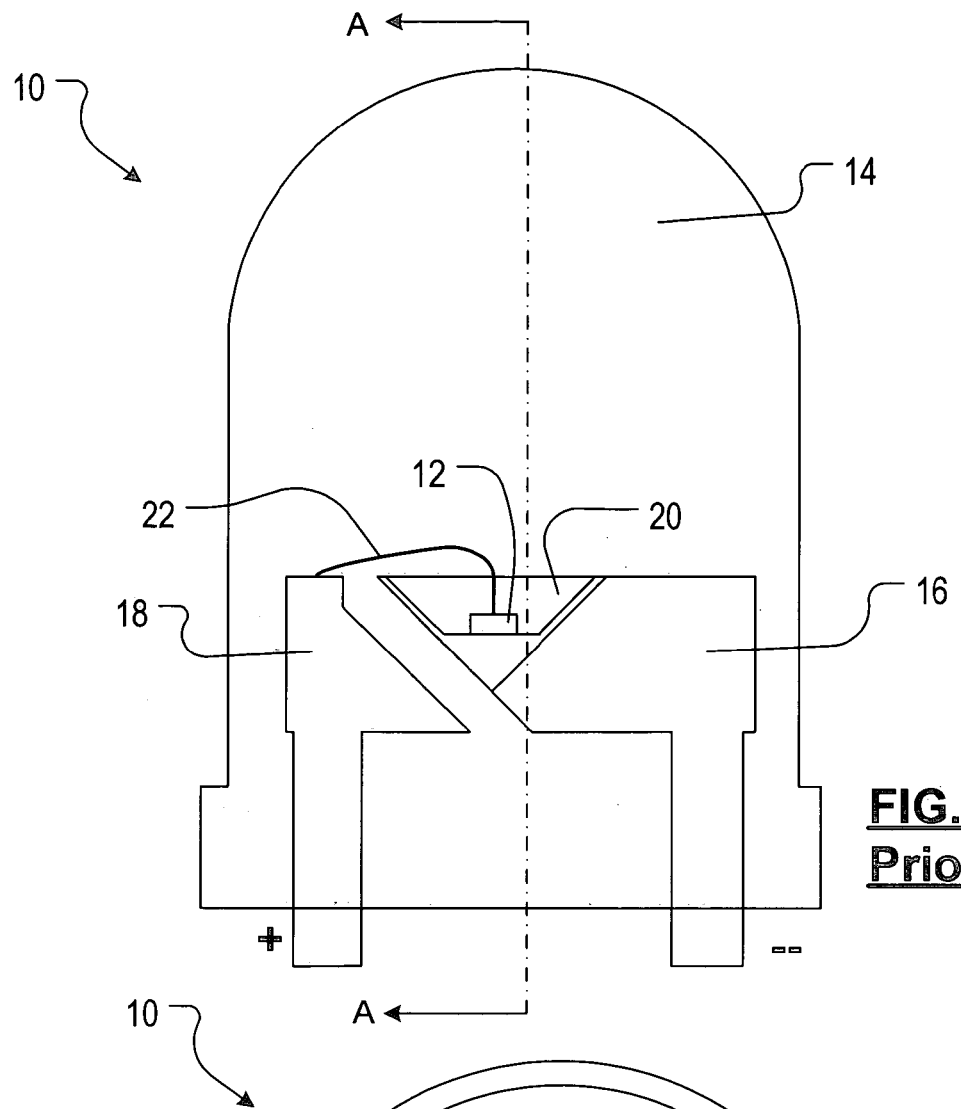
FIGS. 1A and 1B are side and top views respectively, of a typical light emitting diode (LED) package.
Figure 1B:
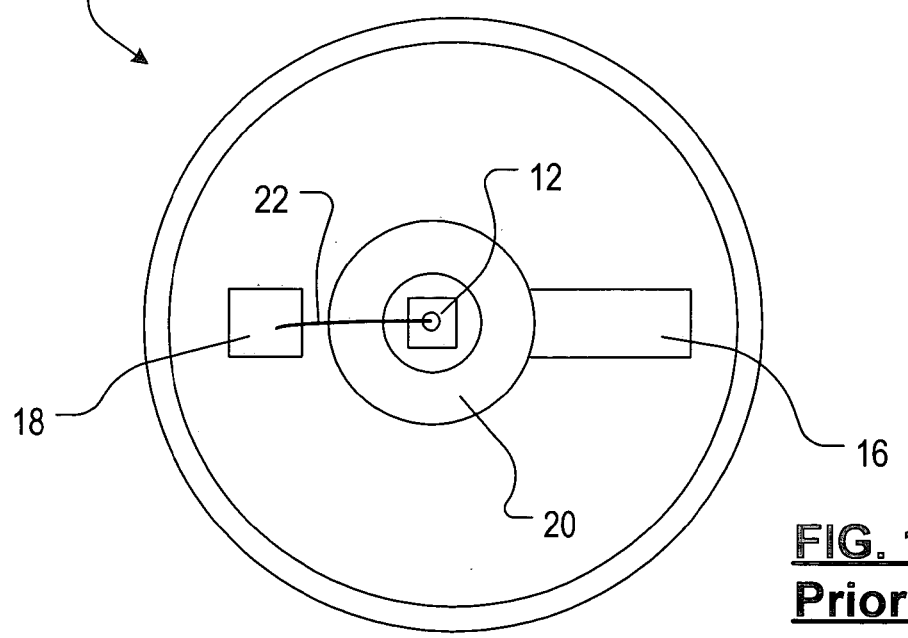

FIG. 1 illustrates a side view of a typical LED package 10. The LED package 10 includes a semiconductor chip 12 embedded within a resin case 14, which is typically made of a clear or colored transparent plastic material. The semiconductor chip 12 is coupled to electrodes 16 (directly) and 18 (via lead 22) in order to provide a driving voltage to the semiconductor LED chip 12. A reflector 20 may be provided to direct light emitted by the LED chip out of the LED package 10 in a preferred direction. Features and elements of such LED packages are well known in the art, and will not be described further herein.

Figure 2:
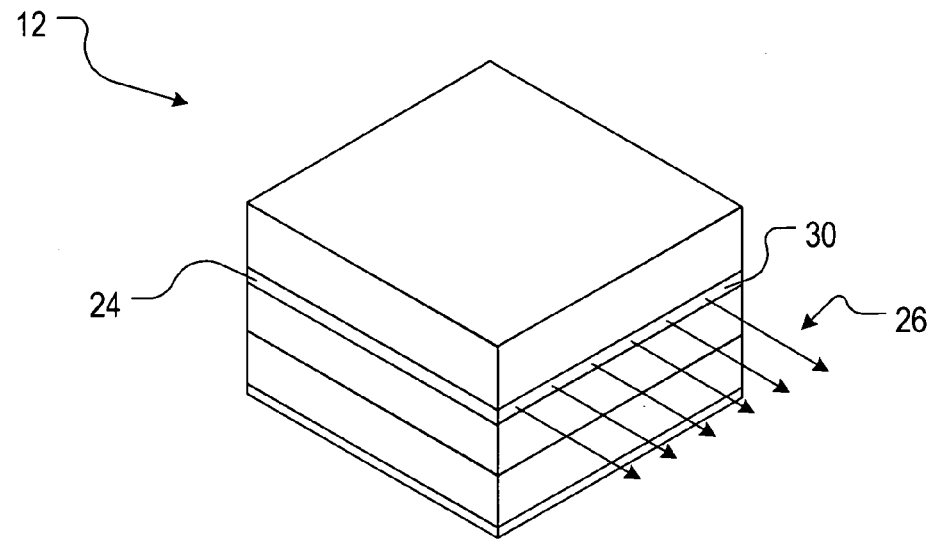
FIG. 2 illustrates an example of a LED chip contained within the LED package of FIG. 1.

FIG. 2 illustrates a LED typical semiconductor chip 12 used in the LED package of FIG. 1. The semiconductor LED chip 12 has a conventional layered structure, which includes a number of layers, including an active layer 24 from which light emerges from a light emitting face 30 of the LED chip 12, generally as shown by the arrows 26.

Figure 3:
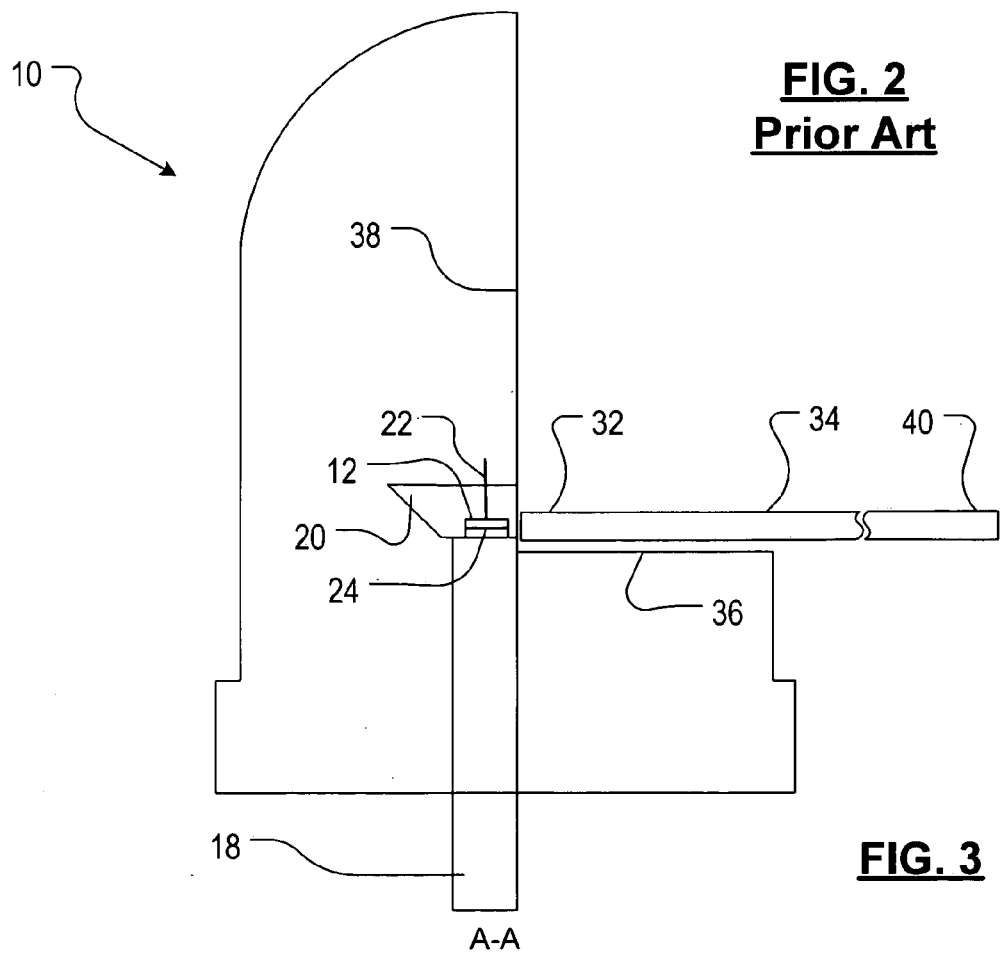
FIG. 3 is a cross-sectional view of the LED package of FIG. 1, taken along line A—A and showing the LED chip coupled to an optical fiber in accordance with the present invention.

As illustrated in FIG. 3 radiation (light) from the LED chip 12 is coupled into an optical fiber 34 by mounting an input end 32 of the optical fiber 34 close to the light emitting face 30 of the LED chip 12. This is accomplished by removing (cutting, polishing, etching, evaporating, etc.) the LED package 10 to define a transmission surface 38 substantially parallel to the light emitting face 30 of the LED chip 12, and a support surface 36 substantially parallel to the active layer 26 of the LED chip 12. Preferably, the LED package 10 is cut so that the transmission surface 38 is as close as possible to the LED chip 12 without damaging either the chip 12 or the electrodes 16 and 18, and lead 20. In order to maximize coupling efficiency, the transmission surface 38 should preferably be substantially parallel to the light emitting face 30 of the LED chip 12, and smoothly polished to minimize scattering. Preferably, an index matching liquid is also applied to reduce those losses, as will be described below.

The support surface 36 is designed to provide a solid base to which the input end 32 of the optical fiber 34 can be affixed, and is positioned relative to the LED chip 12 to allow mechanical positioning of the input end 32 relative to the active layer 24 of the LED chip 12. In many cases the size of a conventional fiber core is approximately equal to the thickness of the active layer 24 of the LED chip 12. Equal sizes of the fiber core and the thickness of the active layer 24 make the efficiency of the coupling of the LED package and the fiber 34 highly sensitive to their respective orientation. Therefore, supporting surface 36 should preferably be positioned to enable the input end 32 of the fiber 34 to be mechanically aligned with the active layer 24. This may, for example be accomplished empirically, by monitoring the optical power coupled into the fiber 34, and adjusting the position and angle of the fiber 34 until a maximum optical power is achieved. An automated system for performing this operation will be described below. When the active layer 24 and the input end 32 of the fiber 34 are aligned, the fiber 34 can be affixed to the support surface 36 by applying a suitable adhesive resin. After solidification of the resin, the LED package 10 and the fiber 34 form a robust optical device without using any additional structural elements.

An optical material (resin or other) can be placed between the input end 32 of the fiber 34 and the transmission surface 38 to increase the coupling efficiency. In this case, the refractive index of the optical material is preferably selected in correspondence with the refractive indices of the resin case of the LED package 10 and the core of the fiber 34 to minimize light reflections and to facilitate light transmission from the semiconductor chip 12 to the input end 32 of the fiber 34.

If desired the optical material may be provided an either ultra violet curable optical resin or a photopolymer curable by a predetermined frequency light. This enables formation of an optical guide or an additional collimation of light between the transmission surface 38 and the input end 32 of the fiber 34. The above mentioned resin or photopolymer can be further solidified by irradiating the optical resin with ultraviolet radiation or by injecting light from an output end 40 of the fiber 34 and/or from the semiconductor LED chip 12 or from both sides. Note that in the case of using light from the emitting source, its wavelength would preferably be in the sensitivity zone of the curable or photo polymerizable material to efficiently create the channel.

Figure 4:
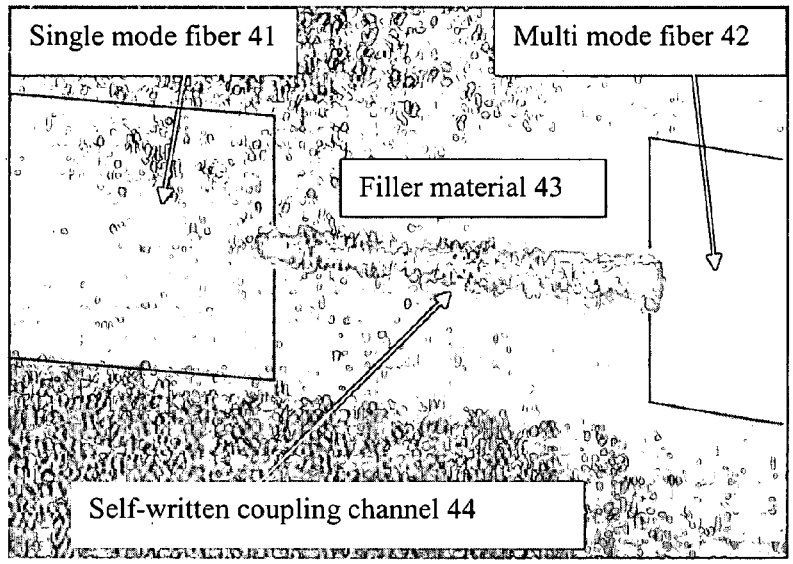
FIG. 4 is a photograph showing self written channel between singlemode and multimode optical fibers.

An example realization (for the case of one fiber, as emitting device, and another fiber to be coupled with the first one) is presented in the photograph of FIG. 4. To demonstrate the power of the method, fibers with various mode properties are used. Thus, a single mode fiber 41 is approached roughly to a multimode fiber 42 using a ferrule (other micro positioning elements, like V-grooves, may be used also). The space between the two fibers is filled by a photopolymerizable material 43, which is sensitized to the red spectral band to allow the initiation of the photopolymerization using the light of a red He—Ne laser operating at 632.8 nm. In the illustrated example, the photopolymerazable material 43 is a Bengal Rose doped photopolymer. The He—Ne laser beam is split into two arms and injected in both fibers to create counter-propagating beams in the space between the two fibers filled by the photo sensitized monomer solution. The appropriate choice of the distance between fibers and the regime of light exposition leads to the creation of an excellent channel 44, which guides the light from one fiber to the other improving significantly the coupling efficiency.

Naturally, this method may be used also to couple other kind of light emitting devices and wave guides. Examples of such sources are vertical cavity surface emitting lasers, traditional edge emitting diode lasers, fibers and planar wave guides.

Figure 5:
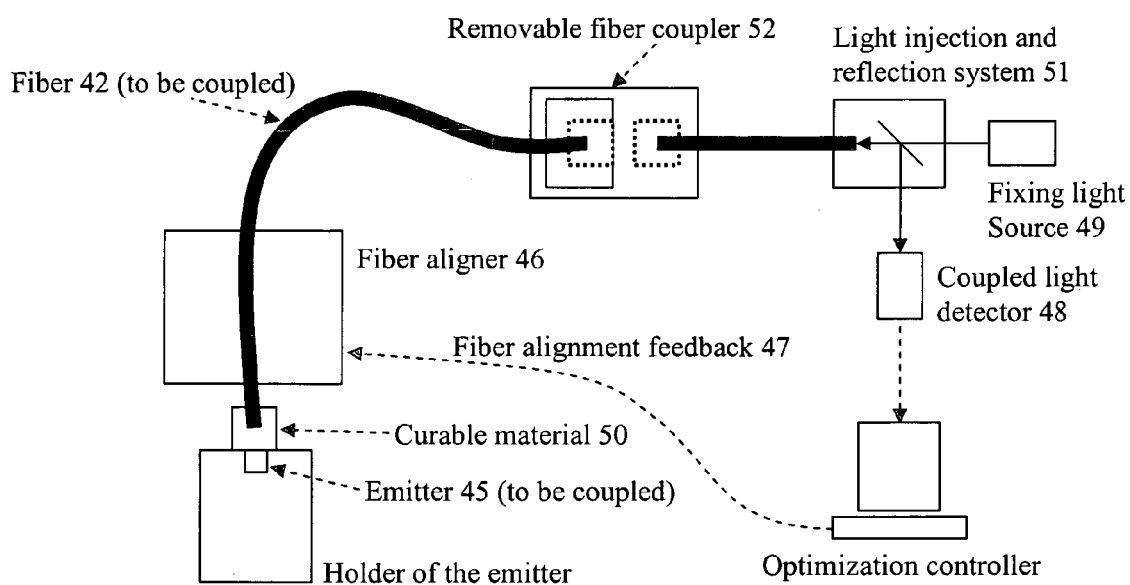
FIG. 5 is a schematic diagram illustrating principal elements in a coupling process optimization and automation system in accordance with the present invention.

However, all the described above methods of coupling will not be efficient if the coupling process is done manually. That is why an automated device is utilized in the present invention to automate and optimize the coupling process. FIG. 5 is a schematic diagram illustrating such a device. The fiber 42 to be coupled is aligned with respect to the emitting source 45 by a fiber aligner 46, which is controlled by a control feedback 47. This feedback is created via detecting (by the detector 48) the efficiency of the emitter's light coupling into the fiber 42. At the same time, the device contains a relatively powerful light source 49 (right hand source in FIG. 5) to at least partially solidify the coupling material 50 via e.g., curing or photo polymerization. The operation of the device may preferably be as follows. The emitter 45 is switched on and the fiber 42, to be coupled, is brought in the proximity of the coupling emitter. The curable material 50 is injected between the fiber 42 and the emitter 45 and the coupling detection system 48 is then used to optimize the alignment of the fiber via continually detecting the coupled light during the alignment of the fiber 42. The fixing light source 49 is then switched on and brought into the coupling zone using the light injection system 51 and removable fiber coupler 52. The simultaneous illumination of both sources (the fixing source and the emitter) creates the guiding channel. The alignment of the fiber is continually optimized by the feedback system to achieve the best coupling.

Figure 6:
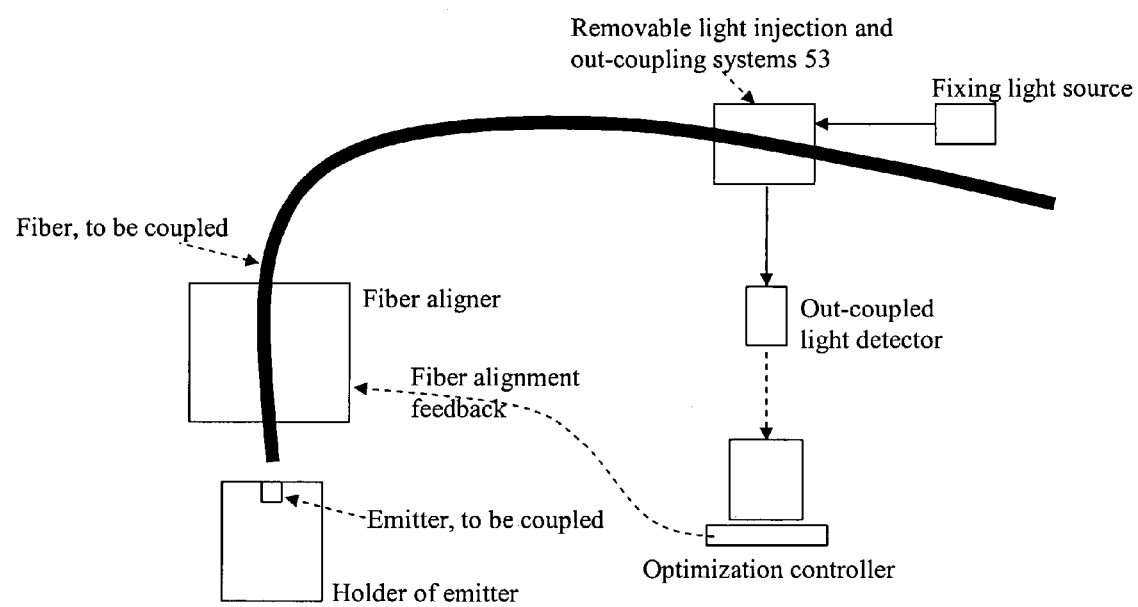
FIG. 6 is a schematic diagram illustrating principal elements in a fiber side-out coupling and fiber side injection system in accordance with the present invention.

In the case of emitter-to-long fiber or fiber-to-fiber coupling, a special contra-propagating light injection system may be applied to increase the collimating properties of the coupling. Namely, very often (e.g., in the so called out-door coupling conditions) the length of the fiber, to be coupled, may be so big that the light injection from the fixing source becomes non-efficient. This is in particular the case when using ultra violet curable materials and glass fibers, which absorb the UV light making thus impossible the injection of light from the far end of the fiber. If possible, a fiber cut, coupling, fixing and final re-splicing may be applied. Otherwise, the above mentioned (in FIG. 5) automated alignment and fixing device may be further transformed and adapted for this purpose in the way demonstrated in the FIG. 6. In this case, special side fiber-out-coupling and side-fiber-injection systems 53 (separately or combined) may be used to inject into the fiber the light of the fixing source, and at the same time, to out-couple the light injected by the emitting source and detect its efficiency for the optimization feedback. The operation of such side-coupling and side-injection elements may be based on the fiber bending, fiber approached side-grating, combined or other well known in the art methods without cutting out the fiber. The operation of the whole system is then similar to the previous case. Obviously, the light emitter here may be another fiber. The same approaches may be used also for planar wave guiding structure coupling.

In another aspect of the present invention, the above mentioned optical resin or photopolymer preferably contains a material composition, which is dynamically (non remnant) sensitive to an excitation such as electric field, stress, heat, etc. In this case, the application of the external excitation may change the properties of light propagation through that material and consequently the light coupling conditions. Thus, the light coupling may be externally controlled or self-controlled. An example of such a device is the composite monomer or pre-polymer solution, which contains liquid crystal electro-optic materials. The described above solidification of the composite material, which is placed between the coupling surfaces, may then result in the formation of polymer stabilized liquid crystals, polymer dispersed liquid crystals or other kind of material structures, which are sensitive to electric field. The optical properties of this material may then be changed using appropriate electrodes arranged near the coupling space. Thus, the application of the electric field may change the orientation of liquid crystal molecules modifying thus the average refractive index of the composite material, its spatial distribution and consequently the light coupling conditions.

In a particular case of non-remnant light-sensitive material composition (often called: nonlinear materials), used between the coupling surfaces, the coupling efficiency may be controlled in real-time using the guided or emitted light power itself. Thus, for so called self-focusing composite materials, the local refractive index increases upon the light power increase. Such an increase may create a nonlinear optical guide (e.g. for a gaussian profile light emerging from the fiber end or from the emitter or from both sides) improving thus the coupling efficiency upon the increasing the light power. In contrast, the refractive index is reduced in self-defocusing materials for the same power-increase, which may then limit the light transmission through the coupling material via defocalization, which is degrading the guiding channel. Thanks to the dependence of these phenomena upon the polarization of light (as in liquid crystals), the coupling properties may be modified also using the modulation of the polarization state of the emitted light.

The embodiments of the invention described above are intended to be exemplary only. The scope of the invention is therefore intended to be limited solely by the scope of the appended claims.

We claim:

1. A device for automated coupling, optimization and fixation of a waveguide to a light emitting source, comprising:
    a fiber alignment system for aligning an end of the waveguide with the light emitting source;
    a high power external light source for curing a curable material disposed between the end of the waveguide and the light emitting source;
    a light injection and reflection system for injecting light from the high power external light source into the waveguide to propagate toward the light emitting source, and for directing a counter-propagating light from the light emitting source to a detector; and
    an alignment system controller responsive to the detector for controlling the fiber alignment system to adjust the alignment between the end of the waveguide and the light emitting source so as to optimize a coupling efficiency between the light emitting source and the waveguide.

* * * * *